United States Patent [19]
Ball et al.

[11] 3,949,376
[45] Apr. 6, 1976

[54] DATA PROCESSING APPARATUS HAVING HIGH SPEED SLAVE STORE AND MULTI-WORD INSTRUCTION BUFFER

[75] Inventors: Roger James Ball, Cheadle Hulme; Andrew Gibson Williams, Heald Green, both of England

[73] Assignee: International Computers Limited, London, England

[22] Filed: July 12, 1974

[21] Appl. No.: 488,200

[30] Foreign Application Priority Data
July 19, 1973 United Kingdom............... 34429/73

[52] U.S. Cl. ........................................... 340/172.5
[51] Int. Cl.² ........................................ G06F 9/06
[58] Field of Search ................................. 340/172.5

[56] References Cited
UNITED STATES PATENTS

| | | |
|---|---|---|
| 3,573,854 | 4/1971 | Watson et al.................... 340/172.5 |
| 3,717,850 | 2/1973 | Ghiron et al..................... 340/172.5 |
| 3,736,566 | 5/1973 | Anderson et al. ............... 340/172.5 |
| 3,840,861 | 10/1974 | Amdahl et al. .................. 340/172.5 |

*Primary Examiner*—David H. Malzahn
*Attorney, Agent, or Firm*—George R. Douglas, Jr.; Anthony D. Cennamo

[57] ABSTRACT

Instructions are written in multi-word blocks into an instruction buffer from a slave store, and then scanned sequentially. The instruction buffer is unequally divided, a first part of a block being written into the smaller portion of the buffer during scanning of the larger portion, and the remainder of the block being written into the larger portion during scanning of the smaller portion. Thus, more time is available for an initial write from a block, which is when delays are more likely to occur due to the block having to be fetched from main store.

4 Claims, 1 Drawing Figure

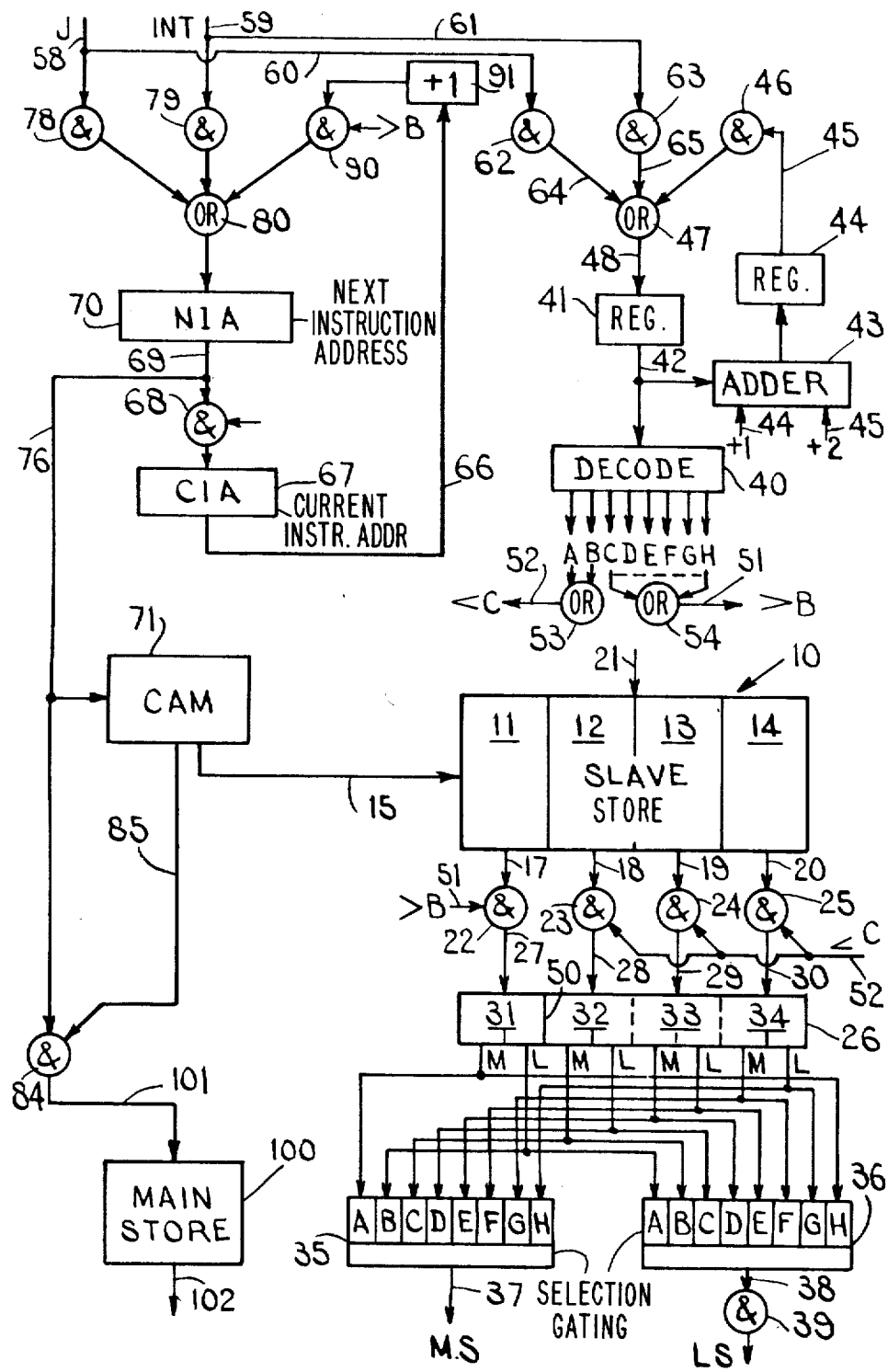

DATA PROCESSING APPARATUS HAVING HIGH SPEED SLAVE STORE AND MULTI-WORD INSTRUCTION BUFFER

BACKGROUND OF THE INVENTION

This invention relates to data processing apparatus and in particular to instruction fetching in such apparatus.

In program controlled data processing apparatus it is usual for program instructions to be held in a main store and to be fetched from the store for execution when required. The speed of operation of such apparatus is clearly restricted by the time required to fetch an instruction. It has also been proposed to provide, in association with the main store, a smaller but faster slave store which is arranged to hold a copy of information in the main store, which is in current use, thus permitting very fast access to that information. The provision of such a slave store can greatly reduce the time required to fetch an instruction, and can thus increase the speed of operation of the apparatus, especially where the program contains a loop of instructions which can be wholly contained within the slave store, since in that case the loop can be performed repeatedly without any access to the main store. However, the slave store is not so effective in the case where the program contains a many sequences of instructions without loops, since in that case a large number of instructions will have to be fetched from the main store.

SUMMARY OF THE INVENTION

According to the invention, there is provided data processing apparatus comprising: a main store capable of holding a sequence of multi-word blocks of instructions; a slave store having a faster access time and a smaller information capacity than the main store; an instruction buffer capable of holding one of the blocks and comprising two sections of unequal size; means for repeatedly scanning the contents of the buffer in a predetermined sequence to provide a succession of instructions for execution; means operative substantially at the start of the scanning of the larger section of the buffer to address the next block in the sequence and to initiate fetching of the words in that block, in parallel, from the main store to the slave store if that block is not yet in the slave store; means operative during scanning of the larger section of the buffer to write a corresponding portion of the addressed block into the smaller section of the buffer; and means operative during scanning of the smaller section of the buffer to write the remaining portion of the addressed block into the larger section of the buffer.

As will be shown, the use of an unequally divided instruction buffer in this manner contributes to increasing the rate of fetching sequential instructions for execution and hence to increasing the speed of operation of the data processing apparatus.

BRIEF DESCRIPTION OF THE DRAWING

One embodiment of the invention will now be described, by way of example, with reference to the accompanying drawing which is a block schematic diagram of an arrangement for fetching instructions in a data processing apparatus.

DESCRIPTION OF THE PREFERRED EMBODIMENT

Referring to the drawing, the apparaus includes a main store 100 in which the program instructions of the apparatus are held. The store 100 is capable of holding a large number of four-word blocks of instructions. In the present embodiment it is assumed that the word length is 32 bits. It is also assumed that an instruction held in the store 100 may either be half-length (16 bits) in which case it is stored in one half of a word, or full-length (32 bits) in which case it is stored in two consecutive half words in the store.

Each block in the store is individually addressable by applying a block address to the store over path 101, which causes the contents of the four words in that block to be read out in parallel over a path 102.

The main store 100 has associated with it a slave store 10 which has a substantially smaller size than the main store; in the present embodiment the slave store 10 holds only 16 four-word blocks. However, the slave store 10 has a substantially faster access time than the main store; for example, the slave store may have an access time of 100 nanoseconds compared with an access time of 1000 nanoseconds for the main store. In the drawing, the slave store 10 is shown partitioned into four sections 11 – 14 corresponding to the four words in a block.

Any four-word block in the slave store can be addressed by an address applied to it on path 15. The contents of the four words in the addressed block appear in parallel on four respective output paths 17 – 20. Moreover, all four words within the addressed block can be loaded in parallel from the main store output 102 over a path 21.

The output paths 17 – 20 are connected by way of respective AND gates 22 – 25 and respective paths 27 – 30 to an instruction buffer register 26 having four word locations 31 – 34 which receive words from respective paths 27 – 30.

Each word loaction in the buffer register has two half-word outputs M and L, representing the more and less significant halves of the corresponding word.

These half word outputs are connected to two sets 35 and 36 of gates each comprising 16-bit wide OR gates fed by eight 16-bit wide AND gates A to H supplied from the register output paths M and L. The set 35 receives the outputs of the register 26 in order: thus, 31M is connected to 35A, and so on up to 34L connected to 35H. The set 36 receives the same outputs shifted forward once so that 31L is connected to 36A and 34L to 36G, with 31M connected to 36H. This connection scheme means that, when any similarly labelled pair of AND gates A to H in the sets 35 and 36 are simultaneously enabled, two consecutive half words in register 36 will appear at outputs 37 to 38 of gating sets 35 and 36, respectively.

It will be seen that a sequence of half-length instructions in the register 26 can be read out on to the path 37 by enabling each of the AND gates A to H in turn. In this case, the path 38 in not required and is blocked by disabling an AND gate 39. Alternatively, a sequence of full-length instructions in the register 26 can be read out on to the paths 37, 38 (with the AND gate 39 enabled) by enabling alternate ones of the gates A to H. For example, if the register 26 contains four full-length instructions, one in each of the word locations 31 – 34, these instructions can be read out by enabling the gates A, C, E and G in turn.

A suitable control for enablement of the AND gates A to H is shown in the drawing with eight enable lines emanating from a decoder 40 and also labelled A to H to signify how they correspond with the AND gates of gating sets 35, 36. The decoder 40 is responsive to three instruction address bits that identify half words within a four word block. The current three-bit value is stored in a register 41 and applied over path 42 to the decoder 40. An adder 43 is also shown fed from the path 42 and is operative to add 1 or 2 (binary 001 or 010) depending on whether half or full-length instructions are involved, as represented by the states of control inputs 44 and 45. The output of adder 43 is fed to another register 44 having its output 45 connected to an AND gate 46 feeding one input of an OR gate 47 having its output 48 connected to the current address register 41. The AND gate 46 will be enabled for every instruction cycle of the instruction fetch unit, except when a jump in the regular instruction sequence occurs.

The arrangement of the registers 41, 44, adder 43 and gates 46 and 47 is, in effect, a counter able to count in ones or twos depending on the instruction length specified. Successive values of the register output 42 will cause the decoder to step along and energise its outputs A to H one at a time in a sequence involving either every one, or every other one, of the outputs as required to control the gating sets 35, 36. Any mixture of short and long instructions can be handled in this way.

The decoder 40 thus serves to sequentially address instructions once they have been loaded into the instruction buffer register 26 and can do so very rapidly using the comparatively simple logic circuitry involved in feeding the decoder 40 and selecting the outputs 37 and 38.

As shown in the drawing, the buffer register 26 is unequally divided at 50 into a first section comprising the first word location 31 and a second section comprising the other three word locations 32 – 34. While instructions in the second section are being executed, the AND gate 22 is enabled to allow the first word of the next block of instructions to be gated from the slave store into the first word location 31. Of course, if the required block is not present in the slave store, there will be a delay while the block is fetched from the main store 100. The manner in which the blocks are fetched will be described later. Similarly, while the instruction in the word location 31 is being executed, the AND gates 23 – 25 are enabled so as to load the second buffer register section 32 – 34 with the remaining three words of the next block from the slave store 10. It will be appreciated that, provided no jump instrucions have occurred, these three words should already be present in the slave store, having been fetched from the main store, if necessary, during the execution of the previous block.

It should now be apparent that the reason for the unequal division of the buffer register 26 is to provide a longer period of time for loading the first word in a block of instructions, since delays are more likely to occur in this case than when loading the remaining three words in the block.

The AND gates 22 and 23 – 25 are controlled by enabling signals on respective lines 51 and 52 from respective OR gates 53 and 54. OR gate 53 receives as input the outputs A and B from the decoder 40, while OR gate 54 receives as input the outputs C to H from the decoder. It will be seen that this causes the gates 22 – 25 to be enabled at the appropriate times as described above.

Blocks of instructions are normally addressed sequentially as follows. The block address of the block which is currently being executed is held in a current instruction register 67. This address is applied over a path 66 to an adder 91 which increments the address by unity and applies it to an AND gate 90. The gate 90 is enabled at the start of scanning the second section 32 – 34 of the buffer 26, by means of the output signal from OR gate 54, so as to pass the incremented block address via an OR gate 80 to a next instruction register 70. The contents of the register 70 are subsequently transferred via an AND gate 68 to the current instruction register 67. By repeating this cycle, a sequence of consecutive block addresses is produced.

The block address in register 70 is applied over a path 76 to an associative (contents addressable) memory 71 which contains a table of block addresses of those blocks which are already present in the slave store 10. The associative memory compares the block address on path 76 with each block address in the table, and, if it finds a match, produces an output on path 15 indicating the location of that block in the slave store 10. This output on path 15 is used to address the appropriate block in the slave store so that its contents can be read into the buffer register 26 as described above.

If, on the other hand, no match is found, indicating that the required block is not present in the slave store, a mismatch signal is produced on path 85. The mismatch signal enables an AND gate 84 which passes the block address on path 76 to the address input 101 of the main store, thereby initiating a fetch of the required block. The fetched block appears at the output 102 of the main store, and is written into the slave store 10 over path 21, overwriting one of the blocks already in that store. The contents of this block can then be read into the buffer register 26 as before.

The block to be overwritten is selected by a suitable replacement circuit. One such replacement circuit for a slave store is described in co-pending U.S. patent application Ser. No. 488,202 and in any case it does not form any part of the present invention, and so will not be described in detail here. Briefly, however, the replacement circuit comprises a counter which points to the location in the slave store which is to be overwritten. Whenever the location pointed to is overwritten or read from, the counter is incremented. This ensures that the counter always points to the location which contains the least recently used block. Whenever a block is written into the slave store from the main store, its address is also written into the corresponding location of the associative memory so as to update the table held therein.

As stated above, blocks of instructions are normally addressed sequentially. However, a break in the normal sequence of instructions may occur in the event of a jump or interrupt condition. In such an event, the AND gate 90 is disabled so as to prevent the normally incremented address from being applied to the OR gate 80. In a jump condition, another AND gate 78 is enabled, causing a jump block address, which appears on path 58, to be applied to the OR gate 80. The AND gate 68 is also enabled so that the jump address is written into both the registers 70 and 67 from the gate 80. Similarly, for an interrupt, another AND gate 79 is enabled, causing an interrupt block address to be applied from path 59 to the OR gate 80.

In addition to a block address, each of the jump and interrupt address paths 58, 59 carry a word address indicating which one of the four words within the addressed block contains the next instruction to be executed. These word addresses are applied over paths 60 and 61 to inputs of respective AND gates 62 and 63 whose outputs 64 and 65 provide further inputs to the OR gate 47. During normal sequential execution of instructions the AND gate 46 is enabled and gates 62, 63 are disabled. However, when a jump occurs, gate 62 is enabled instead of gate 46, causing the contents of register 41 to jump to the state indicated by the word address on path 60. Similarly, when an interrupt occurs, gate 63 is enabled instead of gate 46.

In the above description, it is stated that the next instruction register 70 is loaded at the start of scanning the larger section 32 – 34 of the register 26, so as to initiate fetching of the next block of instructions from the main store if it is not already in the slave store. However, it should be appreciated that loading of register 70 can, in fact, be performed any time after the current instructions have been loaded into the section 32 – 34, and may therefore take place during scanning of the smaller section 31.

We claim:

1. Data processing apparatus comprising:
   main store means for holding a plurality of multi-word blocks of instruction;
   slave store means for holding a smaller plurality of multi-word blocks of instructions and having a faster access time than the main store means;
   means for reading a selected multi-word block from the main store means and writing it into the slave store means;
   means for reading a selected multi-word block from the slave store means;
   an instruction buffer holding one multi-word block and comprising two sections of unequal size;
   means for alternately scanning the larger and smaller sections of the buffer to read an output sequence of instructions therefrom;
   means operative during scanning of the larger section of the buffer to gate into the smaller section of the buffer a corresponding portion of said block which is read out of the slave store means; and
   means operative during scanning of the smaller section of the buffer to gate into the larger section of the buffer a corresponding portion of said block which is read out of the slave store means.

2. Apparatus according to claim 1 wherein said means for scanning the instruction buffer comprises:
   a register;
   means for incrementing the contents of the register by a variable amount according to the length of the instructions; and
   gating means for selecting a portion of the contents of the instruction buffer in accordance with the contents of said register.

3. Data processing apparatus comprising:
   storage means for holding a plurality of multi-word blocks of instructions;
   block addressing means for producing a sequence of block addresses;
   means for applying each block address to the storage means to read out a corresponding one of said multi-word blocks;
   an instruction buffer holding one multi-word block and comprising two sections of unequal size;
   means for alternately reading from the smaller and larger sections of the buffer to provide an output sequence of instructions;
   means for producing first and second gating signals during reading from the larger and smaller sections respectively of the buffer;
   first gating means responsive to said first gating signal, for gating into the smaller section of the buffer a corresponding portion of the multi-word block which is read out of the storage means; and
   second gating means responsive to said second gating signal, for gating into the larger section of the buffer a corresponding portion of said block which is read out of the storage means.

4. Apparatus according to claim 3 wherein said storage means comprises:
   main store means for holding a plurality of said multi-word blocks;
   slave store means for holding a smaller plurality of said multi-word blocks and having a faster access time than the main store means;
   means responsive to said block address for determining whether a multi-word block having that address is present in the slave store and, if not, generating a mismatch signal; and
   means responsive to said mismatch signal for applying said block address to the main store to read the corresponding multi-word block therefrom and write it into the slave store.

* * * * *